United States Patent
Kadowaki (10) Patent No.: US 7,505,629 B2
(45) Date of Patent: Mar. 17, 2009

(54) IMAGE PROCESSING METHOD AND APPARATUS

(75) Inventor: Yukio Kadowaki, Nara (JP)

(73) Assignee: Ricoh Company, Ltd., Tokyo (JP)

( * ) Notice: Subject to any disclaimer, the term of this patent is extended or adjusted under 35 U.S.C. 154(b) by 588 days.

(21) Appl. No.: 10/550,169

(22) PCT Filed: Mar. 23, 2004

(86) PCT No.: PCT/JP2004/003918

§ 371 (c)(1), (2), (4) Date: Sep. 20, 2005

(87) PCT Pub. No.: WO2004/088972

PCT Pub. Date: Oct. 14, 2004

(65) Prior Publication Data

US 2006/0227877 A1    Oct. 12, 2006

(30) Foreign Application Priority Data

Mar. 28, 2003    (JP)    ............................. 2003-090825

(51) Int. Cl.
G06K 9/36    (2006.01)

(52) U.S. Cl. .................................... 382/232

(58) Field of Classification Search ................ 382/232, 382/236, 238–240, 248; 348/384.1, 394.1–395.1, 348/398.1–404.1, 408.1, 430.1–431.1; 375/240.02, 375/240.11, 240.18–240.19; 708/317, 400–401
See application file for complete search history.

(56) References Cited

U.S. PATENT DOCUMENTS

| | | | |
|---|---|---|---|
| 6,266,450 B1 | 7/2001 | Yip et al. | |
| 7,127,117 B2 * | 10/2006 | Sano et al. | 382/240 |
| 7,310,447 B2 * | 12/2007 | Yano et al. | 382/236 |
| 7,315,651 B2 * | 1/2008 | Sakuyama et al. | 382/232 |
| 7,330,596 B2 * | 2/2008 | Suino et al. | 382/240 |
| 7,333,664 B2 * | 2/2008 | Sakuyama et al. | 382/240 |
| 7,336,852 B2 * | 2/2008 | Nomizu et al. | 382/284 |
| 2002/0168112 A1 | 11/2002 | Schwartz et al. | |
| 2003/0206656 A1 | 11/2003 | Schwartz et al. | |

(Continued)

FOREIGN PATENT DOCUMENTS

EP    0905978 A2    3/1999

(Continued)

OTHER PUBLICATIONS

"Summary of New International Standard (JPEG2000) For Still Image Encoding", Video Information Media Society Magazine 2000, vol. 54, No. 2, pp. 164-171.

(Continued)

*Primary Examiner*—Jose L Couso
(74) *Attorney, Agent, or Firm*—Cooper & Dunham, LLP (57) ABSTRACT

An image processing method generates TAG information based on inclusion information which indicates an existence of significant data in code blocks for each of sub-bands, according to JPEG2000 standard. The image processing method accepts the inclusion information of the code blocks in a predetermined sequence in units of code blocks amounting to a number which is smaller than a number of code blocks of sub-bands in all levels, and immediately generates and outputs TAG information corresponding to the accepted inclusion information.

16 Claims, 9 Drawing Sheets

U.S. PATENT DOCUMENTS

2003/0206661 A1 11/2003 Schwartz et al.
2004/0028284 A1 2/2004 Schwartz et al.

FOREIGN PATENT DOCUMENTS

| EP | 1233624 A1 | 8/2002 |
|---|---|---|
| JP | 2003-101788 | 4/2003 |
| JP | 2003-274405 | 9/2003 |

OTHER PUBLICATIONS

Jul. 3, 2007 European Search Report in connection with corresponding European patent Application No. 04 72 2677.

ISO/IEC JTC1/SC29 WG1, "JPEG 2000 Part 1 020719" (Final Publication Draft).

M.D. Adams et al., "The JPEG-2000 Still Image Compression Standard".

C. Christopoulos, "JPEG 2000 Verification Model 8.0".

K. Andra et al., "A high performance JPEG2000 architecture", Proc. 2002 IEEE International Symposium on Circuits and Systems.

* cited by examiner

| 67 | 68 | 69 | 70 | 71 | 72 | 73 | 74 |
| 75 | 76 | 77 | 78 | 79 | 80 | 81 | 82 |
| 83 | 84 | 85 | 86 | 87 | 88 | 89 | 90 |
| 91 | 92 | 93 | 94 | 95 | 96 | 97 | 98 |
| 99 | 100 | 101 | 102 | 103 | 104 | 105 | 106 |
| 107 | 108 | 109 | 110 | 111 | 112 | 113 | 114 |
| 115 | 116 | 117 | 118 | 119 | 120 | 121 | 122 |
| 123 | 124 | 125 | 126 | 127 | 128 | 129 | 130 |

| 67 | 68 | 69 | 70 | 71 | 72 | 73 | 74 |
| 75 | 76 | 77 | 78 | 79 | 80 | 81 | 82 |
| 83 | 84 | 85 | 86 | 87 | 88 | 89 | 90 |
| 91 | 92 | 93 | 94 | 95 | 96 | 97 | 98 |
| 99 | 100 | 101 | 102 | 103 | 104 | 105 | 106 |
| 107 | 108 | 109 | 110 | 111 | 112 | 113 | 114 |
| 115 | 116 | 117 | 118 | 119 | 120 | 121 | 122 |
| 123 | 124 | 125 | 126 | 127 | 128 | 129 | 130 |

| 67 | 68 | 69 | 70 | | | | |
| 75 | 76 | 77 | 78 | | | | |
| 83 | 84 | 85 | 86 | | | | |
| 91 | 92 | 93 | 94 | | | | |
| | | | | 103 | 104 | 105 | 106 |
| | | | | 111 | 112 | 113 | 114 |
| | | | | 119 | 120 | 121 | 122 |
| | | | | 127 | 128 | 129 | 130 |

FIG.5D

| 67 | 68 | 69 | 70 | | | | |
| 75 | 76 | 77 | 78 | | | | |
| 83 | 84 | | | | | | |
| 91 | 92 | | | | | | |
| | | | | | | 105 | 106 |
| | | | | | | 113 | 114 |
| | | | | 119 | 120 | | |
| | | | | 127 | 128 | | |

FIG.6A

12 BITS IN TOTAL

|        |   |   |         |
|--------|---|---|---------|
| (101)  | 5 | 6 | (110)   |
| (100)  | 4 | 8 | (1000)  |

FIG.6B

TAG-ZERO
NO. OF BIT-PLANES 4   100   11 BITS IN TOTAL

|     |   |   |       |
|-----|---|---|-------|
| (1) | 1 | 2 | (10)  |
| (0) | 0 | 4 | (100) |

IMAGE PROCESSING METHOD AND APPARATUS

TECHNICAL FIELD

This disclosure generally relates to image processing methods and apparatuses, and more particularly to an image processing method for encoding and decoding image data in conformance with the JPEG2000, and an image processing apparatus which employs such an image processing method.

BACKGROUND ART

Recently, the JPEG2000 has become known as an encoding technique suited for treating high-definition images. According to an encoding process of the JPEG2000, image data are transformed or converted into data of color components Y, Cb and Cr, and then subjected to a two-dimensional discrete wavelet transform as a frequency analysis with respect to the data of the color components Y, Cb and Cr. Data of wavelet coefficients obtained by the two-dimensional discrete wavelet transform are divided into bit-planes using sub-bands as the processing unit. The data of each bit-plane are scanned by 3 methods in an order starting from significant data, for each sub-band, and subjected to an arithmetic encoding.

Inclusion information which indicates the existence of significant data in units of code blocks, a number of bit-planes in which all significant bits of the code block are zero (hereinafter referred to as zero-bit-planes), a number of encoding paths and a number of bytes of the codes, are checked from encoded data generated by the arithmetic encoding, so as to generate a packet header. A codestream (or code sequence) is formed by arranging the packet header and the encoded data for each sub-band, and output as the data of the codestream which is obtained by encoding the image data. The encoding process of the JPEG2000 is further described in "Summary of New International Standard (JPEG2000) For Still Image Encoding", Video Information Media Society Magazine 2000, Vol. 54, No. 2, pp. 164-171.

According to the JPE2000 standard, a concept called "TAG" is employed as a method of describing the inclusion information which is obtained for each code block. More particularly, the code blocks within the sub-band are grouped into groups each made up of 2×2 code blocks, and the TAG of the group is set to "0" if all of the 4 code blocks within the group includes no significant data. The TAG of the group is set to "1" if at least one of the 4 code blocks within the group includes significant data. Then, the TAGs are grouped into TAG groups each made up of 2×2 TAGs. TAG information in a level (or layer) which is one level (or layer) higher is set to "0" if all of the 4 TAGs within the TAG group are "0". On the other hand, the TAG information in a level which is one level higher is set to "1" if at least one of the 4 TAGs within the TAG group is "1". Values of the TAG information in the more significant levels are obtained similarly thereafter, and the TAG information analysis ends by finally specifying the value of the TAG information at the most significant level.

Based on the TAG information which is obtained by the above described technique, when the TAG information of the lower levels is viewed from the TAG information of the most significant level and the value of the TAG information of a certain level is "0", it may be judged that all of the code blocks located in the levels lower than the certain level have no significant data. For example, when extracting the encoded data to be decoded from the codestream in which the packet header and the encoded data of the code blocks of each sub-band are arranged in a predetermined sequence, as a decoding process, the encoded data can be specified without referring to the inclusion information within the packet header with respect to the code blocks located in the levels lower than the level for which the value of the TAG information is "0", thereby omitting unnecessary access.

The JPEG2000 standard also employs, in addition to the above described inclusion information of the code blocks, a concept called "ZERO-TAG" to indicate the number of zero-bit-planes. More particularly, the code blocks within the sub-band are grouped into groups each made up of 2×2 code blocks, and a minimum value of the numbers of the zero-bit-planes in the group is regarded as the value of the ZERO-TAG for the group. The value of the zero-bit-plane in each code block is updated by subtracting the value of the ZERO-TAG for the group from the value of the zero-bit-plane. Further, a minimum value of the 2×2 ZERO-TAGs obtained for an adjacent code block is regarded as the value of a ZERO-TAG of a level which is one level higher, and the value of the 2×2 ZERO-TAGs is updated by subtracting the value of the ZERO-TAG of the level which is one level higher. The values of the ZERO-TAGs of the higher levels are successively obtained in a similar manner, and the ZERO-TAG information analysis ends by finally specifying the value of the ZERO-TAG at the most significant level.

By using the ZERO-TAG information obtained in the above described manner, it is possible to replace the number of zero-bit-plane to a value having a smaller number of digits (or bits), and the amount of data of the codestream can be reduced.

Conventionally, a process for generating the above described information is realized by software processing. For this reason, in addition to a memory for storing the generated TAG information and the ZERO-TAG information, it was necessary to provide a memory for storing processing programs of an operation processing unit such as a CPU and a work memory for use by operations carried out by the CPU. In order to generate the TAG information and the ZERO-TAG information of the most significant level based on the inclusion information and the information related to the number of zero-bit-planes, it is necessary to temporarily store the inclusion information of each code block of all sub-bands in each level and the information related to the number of zero-bit-planes. Consequently, it was-necessary to provide a work memory having a considerably large memory capacity.

SUMMARY

In an aspect of this disclosure, there are provided an image processing method and an image processing apparatus, which realize by hardware, instead of the conventional software processing, a TAG information generator which generates the inclusion information of the packet header and a ZERO-TAG generator which generates the information related to the number of zero-bit-planes, and enable a real-time processing by immediately outputting a result in response to a data input, and to provide an image processing apparatus provided with a TAG information analyzing circuit and/or a ZERO-TAG information analyzing circuit which have a small circuit scale.

In another aspect of this disclosure, an image processing method is provided for generating TAG information based on inclusion information which indicates an existence of significant data in code blocks for each of sub-bands, according to JPEG2000 standard, comprising the steps of (a) accepting the inclusion information of the code blocks in a predetermined sequence in units of code blocks amounting to a number which is smaller than a number of code blocks of sub-bands in all levels; and (b) immediately generating and outputting TAG information corresponding to the accepted inclusion information. According to such an image processing method, it is possible to eliminate the need for a work memory having a large memory capacity to store the inclusion information, which was otherwise required by the conventional software processing, and the TAG information can be generated by real-time processing.

The image processing method may further comprise the steps of (c) accepting data of numbers of zero-bit-planes in a predetermined sequence in units of code blocks amounting to a number which is smaller than a number of code blocks of sub-bands of all levels, the zero-bit-planes being bit-planes in which all significant bits of the code blocks in each of the sub-bands are zero; and (d) immediately generating and outputting ZERO-TAG information corresponding to the accepted numbers of zero-bit-planes, according to the JPEG2000 standard. In this case, it is possible to eliminate the need for a work memory having a large memory capacity to store the data of the number of zero-bit-planes, which was otherwise required by the conventional software processing, and the ZERO-TAG information can be generated by real-time processing.

In another aspect of this disclosure, an image processing method is provided for generating ZERO-TAG information based on data of numbers of zero-bit-planes in which all significant bits of code blocks in each of sub-bands are zero, according to JPEG2000 standard, comprising the steps of (a) accepting data of the numbers of zero-bit-planes in a predetermined sequence in units of code blocks amounting to a number which is smaller than a number of code blocks of sub-bands of all levels; and (b) immediately generating and outputting ZERO-TAG information corresponding to the accepted numbers of zero-bit-planes. According to the image processing method of the present invention, it is possible to eliminate the need for a work memory having a large memory capacity to store the data of the number of zero-bit-planes, which was otherwise required by the conventional software processing, and the ZERO-TAG information can be generated by real-time processing.

In another aspect of this disclosure, there is provided an image processing apparatus comprising a TAG information analyzing circuit to generate TAG information based on inclusion information which indicates an existence of significant data in code blocks for each of sub-bands, according to JPEG2000 standard, the TAG information analyzing circuit accepting the inclusion information of the code blocks in a predetermined sequence in units of code blocks amounting to a number which is smaller then a number of code blocks of sub-bands in all levels, and immediately generating and outputting TAG information corresponding to the accepted inclusion information. According to the image processing apparatus of the present invention, it is possible to eliminate the need for a work memory having a large memory capacity to store the inclusion information, which was otherwise required by the conventional software processing, and the TAG information can be generated by real-time processing.

The image processing apparatus may further comprise a ZERO-TAG information analyzing circuit to generate ZERO-TAG information based on data of numbers of zero-bit-planes in which all significant bits of code blocks in each of sub-bands are zero, according to JPEG2000 standard, the ZERO-TAG information analyzing circuit accepting data of numbers of zero-bit-planes in a predetermined sequence in units of code blocks amounting to a number which is smaller than a number of code blocks of sub-bands of all levels, and immediately generating and outputting ZERO-TAG information corresponding to the accepted numbers of zero-bit-planes. In this case, it is possible to eliminate the need for a work memory having a large memory capacity to store the data of the number of zero-bit-planes, which was otherwise required by the conventional software processing, and the ZERO-TAG information can be generated by real-time processing.

In another aspect of this disclosure, there is provided an image processing apparatus comprising a ZERO-TAG information analyzing circuit to generate ZERO-TAG information based on data of numbers of zero-bit-planes in which all significant bits of code blocks in each of sub-bands are zero, according to JPEG2000 standard, the ZERO-TAG information analyzing circuit accepting data of the numbers of zero-bit-planes in a predetermined sequence in units of code blocks amounting to a number which is smaller than a number of code blocks of sub-bands of all levels, and immediately generating and outputting ZERO-TAG information corresponding to the accepted number of zero-bit-planes. According to the image processing apparatus of the present invention, it is possible to eliminate the need for a work memory having a large memory capacity to store the data of the number of zero-bit-planes, which was otherwise required by the conventional software processing, and the ZERO-TAG information can be generated by real-time processing.

Other objects aspects and further features will be apparent from the following detailed description when read in conjunction with the accompanying drawings.

BEST MODE FOR CARRYING OUT THE INVENTION (1) General Structure:

A description will be given of an embodiment of an image processing apparatus according to the present invention. This embodiment of the image processing apparatus employs an embodiment of an image processing method according to the present invention.

Figure 1:
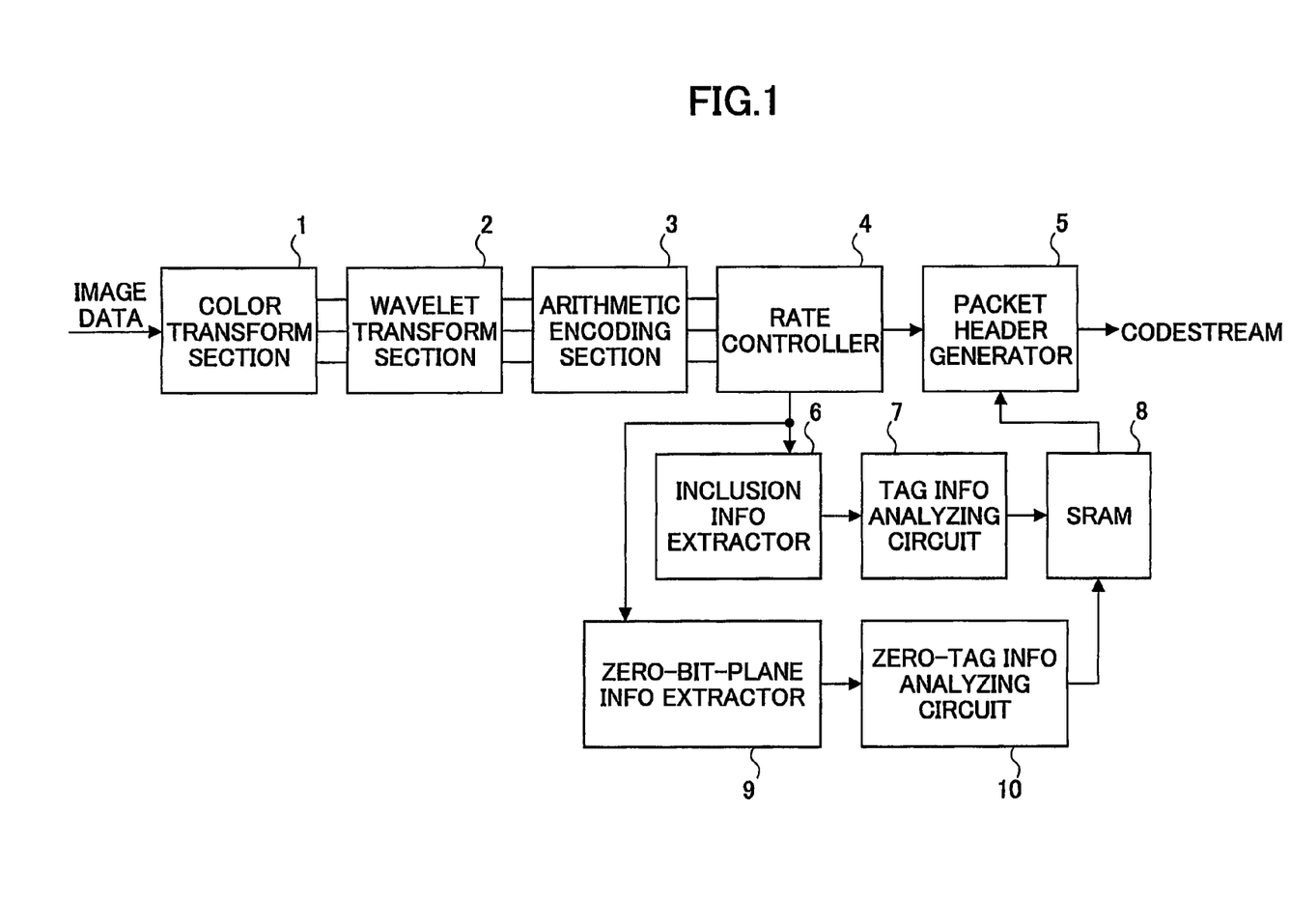
FIG. 1 is a system block diagram showing a part of an embodiment of an image processing apparatus related to an encoding process.

FIG. 1 is a system block diagram showing a part of this embodiment of the image processing apparatus related to an encoding process. As may be seen from FIG. 1, this embodiment carries out the encoding process by a procedure in conformance with the JPEG2000. First, a color transform (or conversion) section 1 transforms (or converts) image data into data of color components Y, Cb and Cr, and a wavelet transform section 2 carries out a two-dimensional discrete wavelet transform with respect to the data of the color components Y, Cb and Cr, as a frequency analysis. An arithmetic encoding section 3 divides data of wavelet coefficients obtained by the two-dimensional discrete wavelet transform into bit-planes using sub-bands as the processing unit. For example, the data of the wavelet coefficient has 16 bits, and the sub-bands in the case of a level-5 wavelet transform are 5LL, 5HL, 5LH, 5HH, 4HL, 4LH, 4HH, 3HL, 3LH, 3HH, 2HL, 2LH, 2HH, 1HL, 1LH, 1HH. In addition, the arithmetic encoding section 3 scans the data of each bit-plane by 3 methods in an order starting from significant data, for each sub-band, and carries out an arithmetic encoding. The 3 methods are called "significant propagation pass", "magnitude refinement pass" and "cleanup pass".

Of the encoded data of the coding path obtained for each code block by the arithmetic encoding described above, a rate controller 4 starts to delete the encoded data corresponding to the bit-plane of the lower level of the wavelet coefficient before the arithmetic encoding, to thereby reduce the code quantity. The deletion of the encoded data means discarding the encoded data. The encoded data after the rate control are output to a packet header generator 5, an inclusion information extractor 6 and a zero-bit-plane information extractor 7.

The inclusion information extractor 6 checks the existence of significant data of each code block, and outputs to a TAG information analyzing circuit 7 inclusion information which is "1" when the significant data exist and "0" when no significant data exist. The TAG information analyzing circuit 7 accepts the inclusion information of the code blocks in a predetermined sequence, in units of code blocks amounting to a number which is smaller than the number of code blocks in the sub-bands of all levels, and immediately generates corresponding TAG information which is output to an SRAM 8. The TAG information analyzing circuit 7 will be described later in more detail.

The-zero-bit-plane information extractor 9 extracts a number of bit-planes in which all bits located in the higher level of the code block are "0", from the encoded data after the rate control. This number of bit-planes in which all bits located in the higher level of the code block are "0", will be referred to as a number of zero-bit-planes. The number of zero-bit-planes extracted by the zero-bit-plane information extractor 9 is output to a ZERO-TAG information analyzing circuit 10. The ZERO-TAG information analyzing circuit 10 accepts the number of zero-bit-planes in a predetermined sequence, in units of code blocks amounting to a number which is smaller than the number of code blocks in the sub-bands of all levels, and immediately generates corresponding ZERO-TAG information which is output to the SRAM 8. The ZERO-TAG information analyzing circuit 10 will be described later in more detail.

According to the JPEG2000 standard, the packet header generator 5 reads the TAG information and the ZERO-TAG information from the SRAM 8, generates the packet header, arranges the encoded data output from the rate controller 4 in a predetermined sequence to form a codestream, and outputs the codestream.

Figure 2:
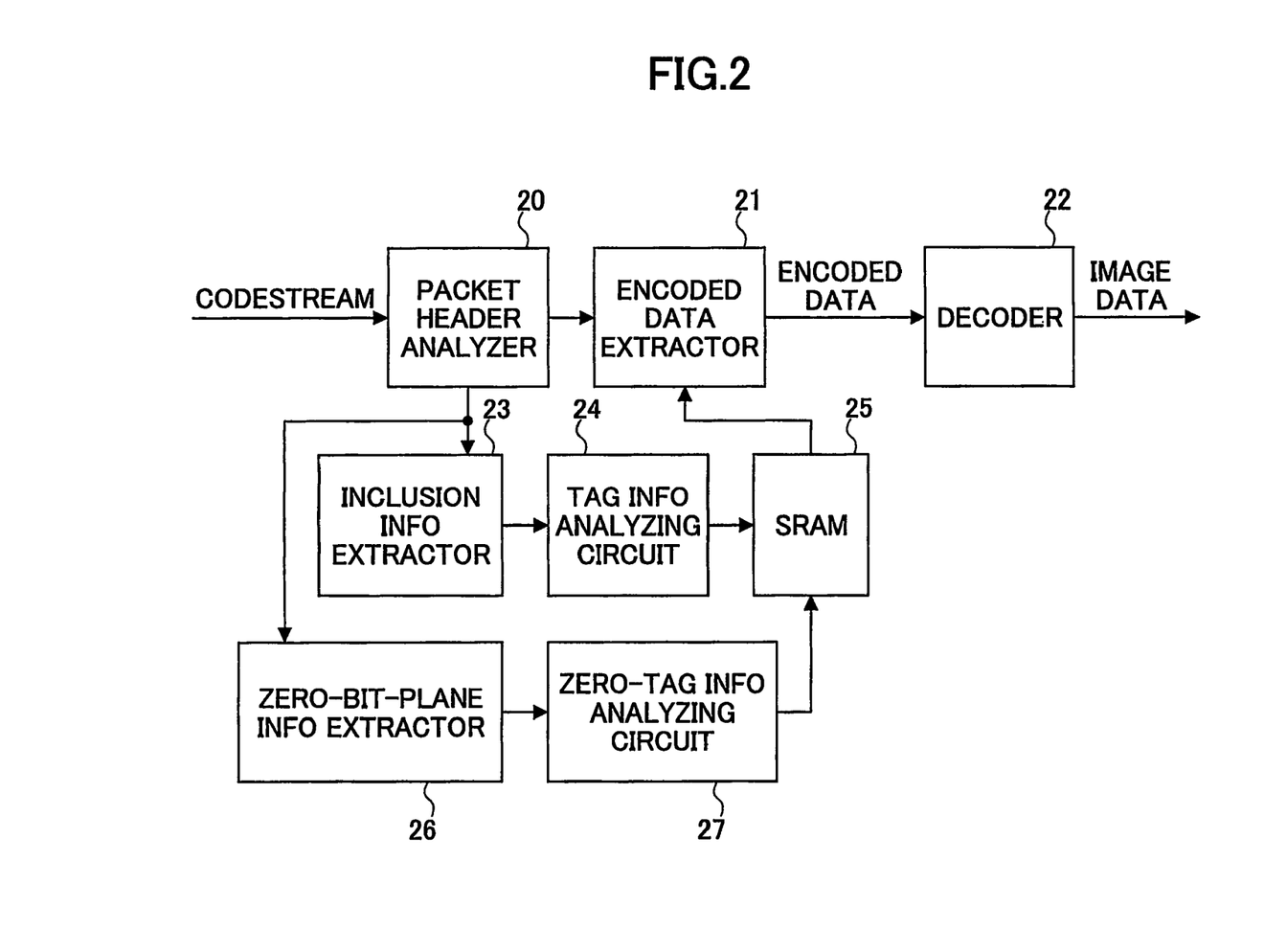
FIG. 2 is a system block diagram showing a part of the embodiment of the image processing apparatus related to a decoding process.

FIG. 2 is a system block diagram showing a part of the embodiment of the image processing apparatus related to a decoding process. As may be seen from FIG. 2, this embodiment carries out the decoding process by a procedure in conformance with the JPEG2000. The data to be decoded is the codestream generated in conformance with the JPEG2000, and has the packet header and the encoded data of the code blocks arranged for each sub-band. First, a packet header analyzer 20 extracts a packet header portion of the codestream. The packet header (packet header data) extracted by the packet header analyzer 20 is output to an inclusion information extractor 23 and a zero-bit-plane information extractor 26.

The inclusion information extractor 23 checks the existence of significant data for each block, and outputs to a TAG information analyzing circuit 24 inclusion information which is "1" when the significant data exist and "0" when no significant data exist. The TAG information extractor 23 immediately generates corresponding TAG information which is output to an SRAM 25 in response to the received inclusion information of the sub-bands, that is, the processing unit. The TAG information extractor 23 will be described later in more detail.

The zero-bit-plane information extractor 26 extracts a number of zero-bit-planes from the packet header data, and the number of zero-bit-planes is output to a ZERO-TAG information analyzing circuit 27. The ZERO-TAG information analyzing circuit 27 immediately generates corresponding ZERO-TAG information which is output to the SRAM 25, in response to the received number of zero-bit-planes of the sub-bands, that is, the processing unit. The ZERO-TAG information analyzing circuit 26 will be described later in more detail.

According to the JPEG2000 standard, an encoded data extractor 21 reads the TAG information and the ZERO-TAG information from the SRAM 25, extracts the encoded data from the codestream which is received via the packet header analyzer 20 based on the read TAG and ZERO-TAG information, and outputs the extracted encoded data to a decoder 22. The decoder 22 carries out a decoding process in conformance with the JPEG2000, and outputs decoded image data.

(2) TAG Information Analyzing Circuit:

Next, a description will be given of the structure and operation of the TAG information analyzing circuits 7 and 24. Since the TAG information analyzing circuits 7 and 24 have the same structure, a description will hereunder be given with respect to the TAG information analyzing circuit 7.

Figure 3:
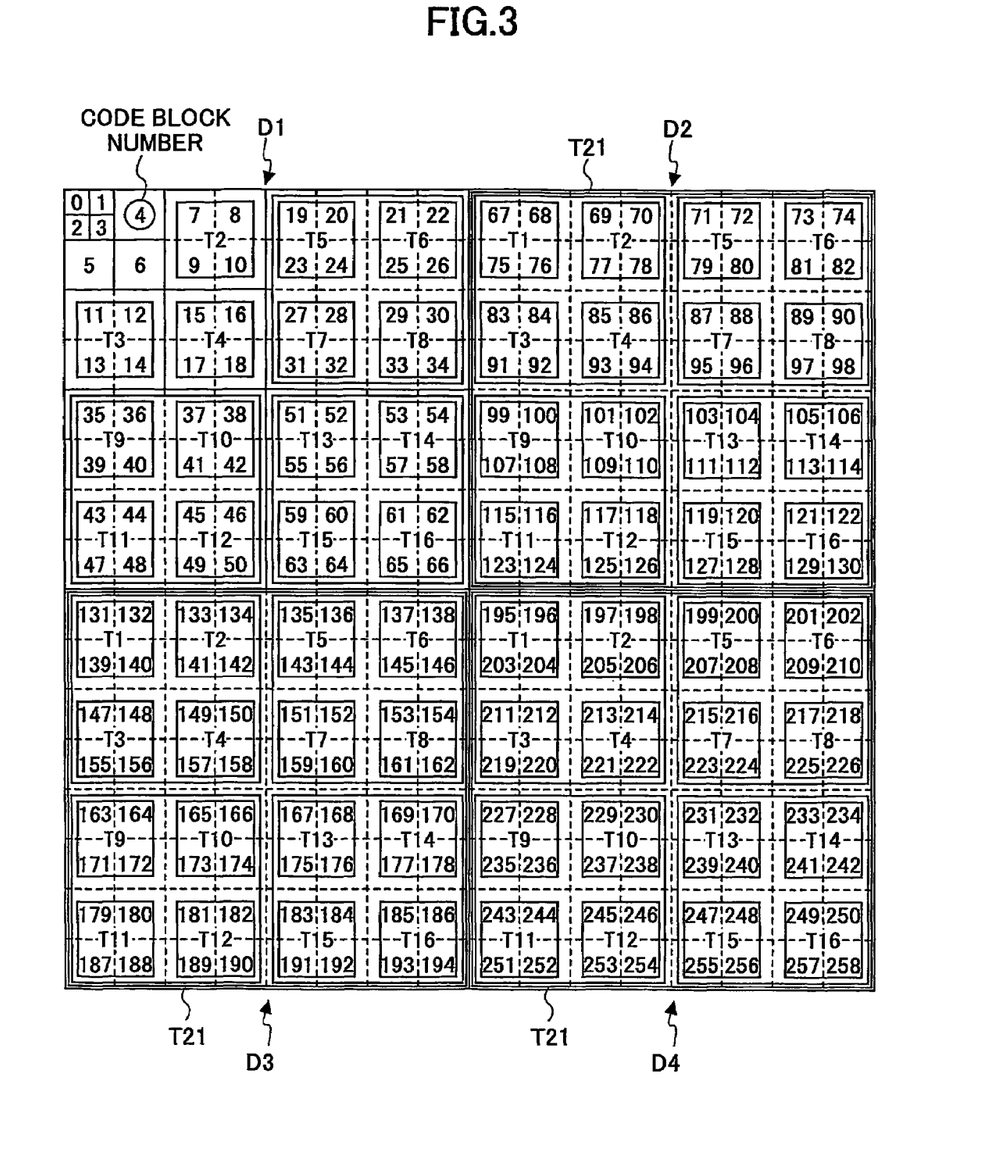
FIG. 3 is a diagram for explaining TAG information generated by a TAG information analyzing circuit.

FIG. 3 is a diagram for explaining the TAG information, generated by the TAG information analyzing circuit 7, and corresponding to each sub-band which is obtained when the level-5 two-dimensional discrete wavelet transform is carried out with respect to the image data. In FIG. 3, reference numerals 0 through 258 are assigned to the code blocks according to a sequence in which the arithmetic encoding process and the rate control process are carried out. In the following description, each code block will be specified using this reference numeral.

FIG. 3 shows TAG information T1 through T16 of a least significant level obtained in units of 2×2 code blocks, TAG information T17 through T20 of a level which is one level higher than the least significant level obtained by grouping 2×2 TAGs of the TAG information T1 through T16 into 4 groups, and TAG information T21 of a most significant level obtained by grouping TAGs of the TAG information T17 through T20 into one group. However, the TAG information is not obtained for the level-5 and level-4 sub-bands, because these sub-bands have a size smaller than or equal to the size of the code block. For this reason, the TAG information T21 of the most significant level is only obtained with respect to each of the sub-bands 1HL, 1LH and 1HH of the level-1.

Figure 4:
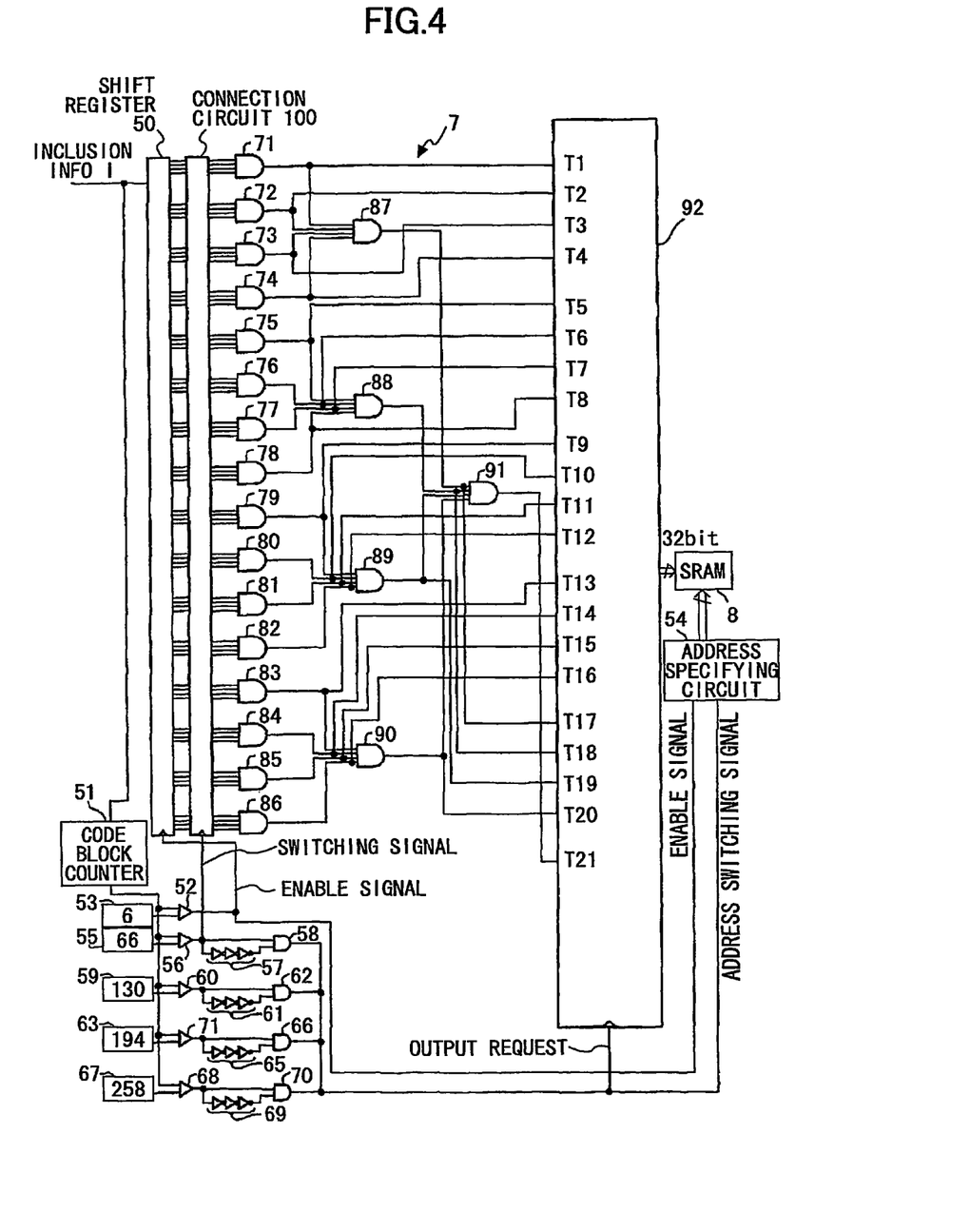
FIG. 4 is a circuit diagram showing the TAG information analyzing circuit.

FIG. 4 is a circuit diagram showing the TAG information analyzing circuit 7. The TAG information analyzing circuit 7 immediately generates the corresponding TAG information and outputs the TAG information to the SRAM 8, by inputting the inclusion information of the code blocks of all level-2 and level-3 sub-bands, the inclusion information of all code blocks of the level-1 sub-band 1HL, the inclusion information of all code blocks of the level-1 sub-band 1LH, and the inclusion information of all code blocks of the level-1 sub-band 1HH in a predetermined sequence.

More particularly, the TAG information analyzing circuit 7 obtains the TAG information of each of the sub-bands in 4 steps, and successively stores the TAG information (32-bit data) of 4 data D1 through D4 shown in FIG. 3 which are obtained by the 4 steps into the SRAM 8. Hence, it is possible to eliminate the need for a work memory having a large memory capacity, which was otherwise required by the conventional software processing. The data D1 is formed by the TAG information T2 through T4 with respect to the level-3 sub-bands 3HL, 3LH and 3HH, the TAG information T5 through T16 with respect to the level-2 sub-bands 2HL, 2LH and 2HH, and the TAG information T18 through T20 with respect to significant level. The TAG information is not obtained for the level-5 and level-4 sub-bands, because the size of these sub-bands is smaller than the size of one code block. Each of the data D2 through D4 is formed by the TAG information T1 through T16, T17 through T20 and T21 with respect to the level-1 sub-bands 1LH, 1LH and 1HH.

Inclusion information I from the inclusion information extractor 6 is sequentially input to a shift register 50. The inclusion information I is a 1-bit data which is "1" when the significant data exist and "0" when no significant data exist, for each code block. The shift register 50 accepts input of the inclusion information I in response to a high-level enable signal which is output from a comparator 52 which will be described later, and stores the inclusion information I in an internal register thereof, while sequentially shifting the inclusion information I. The shift register 50 stores the inclusion information I of a maximum of 64 code blocks in this embodiment, and outputs the inclusion information I of each of the code blocks in parallel to a connection circuit 100.

The connection circuit 100 switches connection contents to AND gates 71 through 86, between a connection for the level-1 sub-bands and a connection for the level-2 through level-5 sub-bands, with respect to the inclusion information I of each of the code blocks received in parallel, in response to a value (high level or low level) of a switching signal which is received from a comparator 56. The connection contents are switched within the connection circuit 100 by using selectors which operate in response to the switching signal.

A description will be given of the connection contents of the connection circuit 100, separately for each of the data D1 through D4.

(a) Writing Data D1:

While the inclusion information I of the 7th through 66th code blocks is input to the shift register 50, a low-level switching signal is input to the connection circuit 100, and the connection circuit 100 switches the connection contents to the connection for the level-2 through level-5 sub-bands. When the input of the inclusion information I of the 7th through 66th code blocks to the shift register 50 is completed, the connection circuit 100 outputs the inclusion information I of each of these blocks to the AND gates 71 through 86 in the following manner.

In this case, no data is input to signal input terminals of the AND gate 71. The inclusion information I of the 7th through 10th code blocks is sequentially input to signal input terminals of the AND gate 72. The inclusion information I of the 11th through 14th code blocks is sequentially input to signal input terminals of the AND gate 73. The inclusion information I of the 15th through 18th code blocks is sequentially input to signal input terminals of the AND gate 74. The inclusion information I of the 19th, 10th, 23rd and 24th code blocks is sequentially input to signal input terminals of the AND gate 75. The inclusion information I of the 21st, 22nd, 25th and 26th code blocks is sequentially input to signal input terminals of the AND gate 76. The inclusion information I of the 27th, 28th, 31st and 32nd code blocks is sequentially input to signal input terminals of the AND gate 77. The inclusion information I of the 29th, 30th, 33rd and 34th code blocks is sequentially input to signal input terminals of the AND gate 78. The inclusion information I of the 35th, 36th, 39th and 40th code blocks is sequentially input to signal input terminals of the AND gate 79. The inclusion information I of the 37th, 38th, 41st and 42nd code blocks is sequentially input to signal input terminals of the AND gate 80. The inclusion information I of the 43rd, 44th, 47th and 48th code blocks is sequentially input to signal input terminals of the AND gate 81. The inclusion information I of the 45th, 46th, 49th and 50th code blocks is sequentially input to signal input terminals of the AND gate 82. The inclusion information I of the 51st, 52nd, 55th and 56th code blocks is sequentially input to signal input terminals of the AND gate 83. The inclusion information I of the 53rd, 54th, 57th and 58th code blocks is sequentially input to signal input terminals of the AND gate 84. The inclusion information I of the 59th, 60th, 63rd and 64th code blocks is sequentially input to signal input terminals of the AND gate 85. The inclusion information I of the 61st, 62nd, 65th and 66th code blocks is sequentially input to signal input terminals of the AND gate 86.

(b) Writing Data D2:

When the inclusion information I of the 67th code block is input to the shift register 50, the low-level switching signal from the comparator 56 input to the connection circuit 100 switches to a high-level switching signal, and the connection circuit 100 switches the connection contents to the connection for the level-1 sub-bands 1HL, 1LH and 1HH. When the input of the inclusion information I of the 67th through 130th code blocks to the shift register 50 is completed, the connection circuit 100 outputs the inclusion information I of each of these blocks output in parallel from the shift register 50 to the AND gates 71 through 86 in the following manner.

The inclusion information I of the 67th, 68th, 75th and 76th code blocks is sequentially input to the signal input terminals of the AND gate 71. The inclusion information I of the 69th, 70th, 77th and 78th code blocks is sequentially input to the signal input terminals of the AND gate 72. The inclusion information I of the 83rd, 84th, 91st and 92nd code blocks is sequentially input to the signal input terminals of the AND gate 73. The inclusion information I of the 85th, 86th, 93rd and 94th code blocks is sequentially input to the signal input terminals of the AND gate 74. The inclusion information I of the 71st, 72nd, 79th and 80th code blocks is sequentially input to the signal input terminals of the AND gate 75. The inclusion information I of the 73rd, 74th, 81st and 82nd code blocks is sequentially input to the signal input terminals of the AND gate 76. The inclusion information I of the 87th, 88th, 95th and 96th code blocks is sequentially input to the signal input terminals of the AND gate 77. The inclusion information I of the 89th, 90th 97th and 98th code blocks is sequentially input to the signal input terminals of the AND gate 78. The inclusion information I of the 99th, 100th, 107th and 108th code blocks is sequentially input to the signal input terminals of the AND gate 79. The inclusion information I of the 101st, 102nd, 109th and 110th code blocks is sequentially input to the signal input terminals of the AND gate 80. The inclusion information I of the 115th, 116th, 123rd and 124th code blocks is sequentially input to the signal input terminals of the AND gate 81. The inclusion information I of the 117th, 118th, 125th and 126th code blocks is sequentially input to the signal input terminals of the AND gate 82. The inclusion information I of the 103rd, 104th, 111st and 112nd code blocks is sequentially input to the signal input terminals of the AND gate 83. The inclusion information I of the 105th, 106th, 113rd and 114th code blocks is sequentially input to the signal input terminals of the AND gate 84. The inclusion information I of the 119th, 120th, 127th and 128th code blocks is sequentially input to the signal input terminals of the AND gate 85. The inclusion information I of the 121st, 122nd, 129th and 130th code blocks is sequentially input to the signal input terminals of the AND gate 86.

(c) Writing Data D3:

When the input of the inclusion information I of the 131st through 194th code blocks to the shift register 50 is completed, the data D3 is generated and output. In this state, the connection circuit 100 outputs the inclusion information I of each of the code blocks output in parallel from the shift register 50 to the AND gates 71 through 86 in the following manner.

The inclusion information I of the 131st, 132nd, 139th and 140th code blocks is sequentially input to the signal input terminals of the AND gate 71. The inclusion information I of the 133rd, 134th, 141st and 142nd code blocks is sequentially input to the signal input terminals of the AND gate 72. The inclusion information I of the 147th, 148th, 155th and 156th code blocks is sequentially input to the signal input terminals of the AND gate 73. The inclusion information I of the 149th, 150th, 157th and 158th code blocks is sequentially input to the signal input terminals of the AND gate 74. The inclusion information I of the 135th, 136th, 143rd and 144th code blocks is sequentially input to the signal input terminals of the AND gate 75. The inclusion information I of the 137th, 138th, 145th and 146th code blocks is sequentially input to the signal input terminals of the AND gate 76. The inclusion information I of the 151st, 152nd, 159th and 160th code blocks is sequentially input to the signal input terminals of the AND gate 77. The inclusion information I of the 153rd, 154th, 161st and 162nd code blocks is sequentially input to the signal input terminals of the AND gate 78. The inclusion information I of the 163rd, 164th, 171st and 172nd code blocks is sequentially input to the signal input terminals of the AND gate 79. The inclusion information I of the 165th, 166th, 173rd and 174th code blocks is sequentially input to the signal input terminals of the AND gate 80. The inclusion information I of the 179th, 180th, 187th and 188th code blocks is sequentially input to the signal input terminals of the AND gate 81. The inclusion information I of the 181st, 182nd, 189th and 190th code blocks is sequentially input to the signal input terminals of the AND gate 82. The inclusion information I of the 167th, 168th, 175th and 176th code blocks is sequentially input to the signal input terminals of the AND gate 83. The inclusion information I of the 169th, 170th, 177th and 178th code blocks is sequentially input to the signal input terminals of the AND gate 84. The inclusion information I of the 183rd, 184th, 191st and 192nd code blocks is sequentially input to the signal input terminals of the AND gate 85. The inclusion information I of the 185th, 186th, 193rd and 194th code blocks is sequentially input to the signal input terminals of the AND gate 86.

(d) Writing Data D4:

When the input of the inclusion information I of the 195th through 258th code blocks to the shift register 50 is completed, the data D4 s generated and output. In this state, the connection circuit 100 outputs the inclusion information I of each of the code blocks output in parallel from the shift register 50 to the AND gates 71 through 86 in the following manner.

The inclusion information I of the 195th, 196th, 203rd and 204th code blocks is sequentially input to the signal input terminals of the AND gate 71. The inclusion information I of the 197th, 198th, 205th and 206th code blocks is sequentially input to the signal input terminals of the AND gate 72. The inclusion information I of the 211st, 212nd, 219th and 220th code blocks is sequentially input to the signal input terminals of the AND gate 73. The inclusion information I of the 213rd, 214th, 221st and 222nd code blocks is sequentially input to the signal input terminals of the AND gate 74. The inclusion information I of the 199th, 200th, 207th and 208th code blocks is sequentially input to the signal input terminals of the AND gate 75. The inclusion information I of the 201st, 202nd, 209th and 210th code blocks is sequentially input to the signal input terminals of the AND gate 76. The inclusion information I of the 215th, 216th, 223rd and 224th code blocks is sequentially input to the signal input terminals of the AND gate 77. The inclusion information I of the 217th, 218th, 225th and 226th code blocks is sequentially input to the signal input terminals of the AND gate 78. The inclusion information I of the 227th, 228th, 235th and 236th code blocks is sequentially input to the signal input terminals of the AND gate 79. The inclusion information I of the 229th, 230th, 237th and 238th code blocks is sequentially input to the signal input terminals of the AND gate 80. The inclusion information I of the 243rd, 244th, 251st and 252nd code blocks is sequentially input to the signal input terminals of the AND gate 81. The inclusion information I of the 245th, 246th, 253rd and 254th code blocks is sequentially input to the signal input terminals of the AND gate 82. The inclusion information I of the 231st, 232nd, 239th and 240th code blocks is sequentially input to the signal input terminals of the AND gate 83. The inclusion information I of the 233rd, 234th, 241st and 242nd code blocks is sequentially input to the signal input terminals of the AND gate 84. The inclusion information I of the 247th, 248th, 255th and 256th code blocks is sequentially input to the signal input terminals of the AND gate 85. The inclusion information I of the 249th, 250th, 257th and 258th code blocks is sequentially input to the signal input terminals of the AND gate 86.

In correspondence with the writing of the data D1 through D4 described above, outputs of the AND gates 71 through 74 are input to a data D generator 92 as the TAG information T1 through T4, and also input to signal input terminals of a 4-input AND gate 87. Outputs of the AND gates 75 through 78 are input to the data D generator 92 as the TAG information T5 through T8, and also input to signal input terminals of a 4-input AND gate 88. Outputs of the AND gates 79 through 82 are input to the data D generator 92 as the TAG information T9 through T12, and also input to signal input terminals of a 4-input AND gate 89. Outputs of the AND gates 83 through 86 are input to the data D generator 92 as the TAG information T13 through T16, and also input to signal input terminals of a 4-input AND gate 980.

Outputs of the AND gates 87 through 90 are input to the data D generator 92 as the TAG information T17 through T20, and also input to signal input terminals of a 4-input AND gate 91. An output of the AND gate 91 is input to the data D generator 92 as the TAG information T21.

The inclusion information I is not only input to the shift register 50, but is also input to a code block counter 51. The code block counter 51 counts up in response to the input of the inclusion information I each having 1 bit, and counts the number of code blocks for which the inclusion information I is input to the shift register 50.

An output of the code block counter 51 is input to one of signal input terminals of the comparator 52. The other signal input terminal of the comparator 52 is connected to a register 53 which is set with a count value "6". The comparator 52 inputs a high-level enable signal to enable terminals of the shift register 50 and an address specifying circuit 54 when the counted value input from the code block counter 51 becomes greater than or equal to "7". The operation of the shift register 50 was described above. The address specifying circuit 54 starts in response to the high-level enable signal, and outputs a write address signal for the data D1 to the SRAM 8. As will be described in the following, the address specifying circuit 54 receives, as an address switching signal, a pulse signal which is output from the AND gates 58, 62, 66 and 70 every time the writing of the inclusion information I for the corresponding data D1, D2, D3 and D4 is completed. In addition, the address specifying circuit 54 sequentially switches the address signal which is output to the SRAM 8 for the data D2, for the data D3, for the data D4 and again for the data D1.

The output of the code block counter 51 is also input to one of signal input terminals of each of the comparators 56, 60, 64 and 68. The other signal input terminal of the comparator 56 is connected to a register 55 which is set with a count value "66". The other signal input terminal of the comparator 60 is connected to a register 59 which is set with a count value "130". The other signal input terminal of the comparator 64 is connected to a register 63 which is set with a count value "194". The other signal input terminal of the comparator 68 is connected to a register 67 which is set with a count value "258".

The comparator 56 outputs a high-level signal when the counted value input from the code block counter 51 becomes greater than or equal to "67". The output of the comparator 56 is input to one of signal input terminals of a 2-input AND gate 58, and input to the other signal input terminal of the 2-input AND gate 58 via a delay circuit 57 which is formed by 3 stages of inverters connected in series. The AND gate 58 outputs a pulse signal once to an address switching signal input terminal of the address specifying circuit 54, in response to the high-level signal from the comparator 56.

The comparator 60 outputs a high-level signal when the counted value input from the code block counter 51 becomes greater than or equal to "131". The output of the comparator 60 is input to one of signal input terminals of a 2-input AND gate 62, and input to the other signal input terminal of the 2-input AND gate 62 via a delay circuit 61 which is formed by 3 stages of inverters connected in series. The AND gate 62 outputs a pulse signal once to the address switching signal input terminal of the address specifying circuit 54, in response to the high-level signal from the comparator 60.

The comparator 64 outputs a high-level signal when the counted value input from the code block counter 51 becomes greater than or equal to "195". The output of the comparator 64 is input to one of signal input terminals of a 2-input AND gate 66, and input to the other signal input terminal of the 2-input AND gate 66 via a delay circuit 65 which is formed by 3 stages of inverters connected in series. The AND gate 66 outputs a pulse signal once to the address switching signal input terminal of the address specifying circuit 54, in response to the high-level signal from the comparator 64.

The comparator 68 outputs a high-level signal when the counted value input from the code block counter 51 becomes greater than or equal to "259". The output of the comparator 68 is input to one of signal input terminals of a 2-input AND gate 70, and input to the other signal input terminal of the 2-input AND gate 70 via a delay circuit 69 which is formed by 3 stages of inverters connected in series. The AND gate 70 outputs a pulse signal once to the address switching signal input terminal of the address specifying circuit 54, in response to the high-level signal from the comparator 68.

Therefore, the AND gates 58, 62, 66 and 70 respectively output the pulse signal when the number of code blocks for which the inclusion information I is input to the shift register 50 reaches "67", "131", "195" and "259". The pulse signal output from the AND gates 58, 62, 66 and 70 is not only input to the address specifying circuit 54, but also input to the data D generator 92 as a signal requesting output of the corresponding data D1 through D4 which are generated by the data D generator 92.

The data D generator 92 arranges the TAG information T1 through T21 output from the AND gates described above from the starting bit, and adds data "0" amounting to 11 bits from the 22nd bit, so as to generate the 32-bit data D1 through D4. The data D generator 92 outputs the data D1 through D4 to the SRAM 8 depending on the pulse signal received from the AND gates 58, 62, 66 and 70. The SRAM 8 stores the 32-bit data D1 through D4 output from the data D generator 92, at addresses specified by the address specifying circuit 54.

Figure 5A:
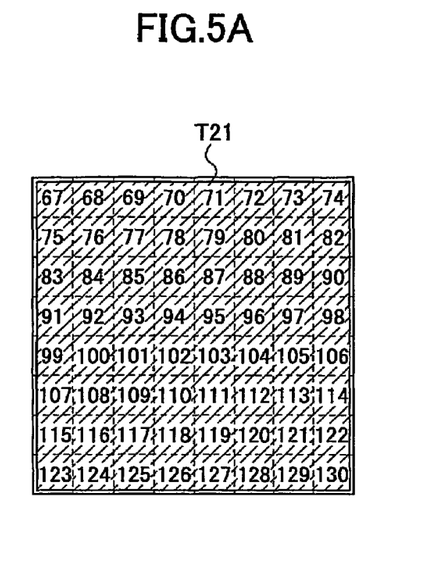
FIGS. 5A through 5D are diagrams for explaining a technique for acquiring inclusion information of a code block using the TAG information.
Figure 5B:
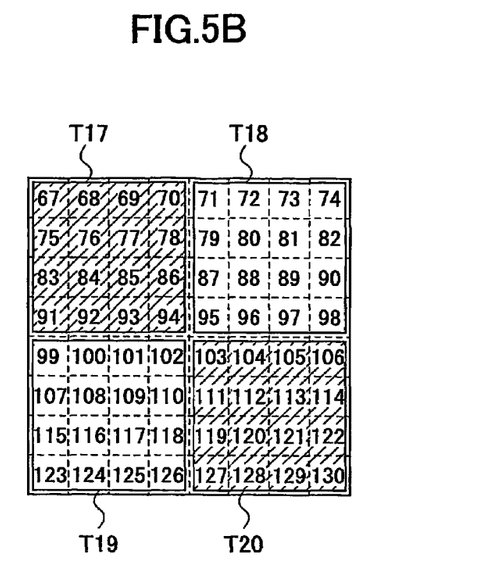

FIGS. 5A through 5D are diagrams for explaining a technique for acquiring inclusion information of a code block using the TAG information. A description will be given of a method of utilizing the data D2 of the TAG information for the level-1 sub-band 1HL stored in the SRAM 8 according to the JEPG2000 standard, by referring got FIGS. 5A through 5D. In FIGS. 5A through 5D, the code block having the inclusion information I for which the TAG is obtained when the value of the TAG information is "1" is indicated by the hatching. As shown in FIG. 5A, when the TAG information T21 located at the most significant level is "1", it may be judged that there is at least one code block having valid data in the sub-bands thereof. Next, the values of the TAG information T17 through T20 located at the level lower than the TAG information T21 is checked. As shown in FIG. 5B, when the TAG information T17 and T20 is "1", it may be seen that a code block having valid data exists within 2 regions indicated by the hatching. On the other hand, it may be seen that a code block having valid data does not exist in regions of the TAG information T18 and T19. Hence, it is unnecessary to confirm the inclusion information I of the packet information and the TAG information located at lower levels.

Figure 5C:
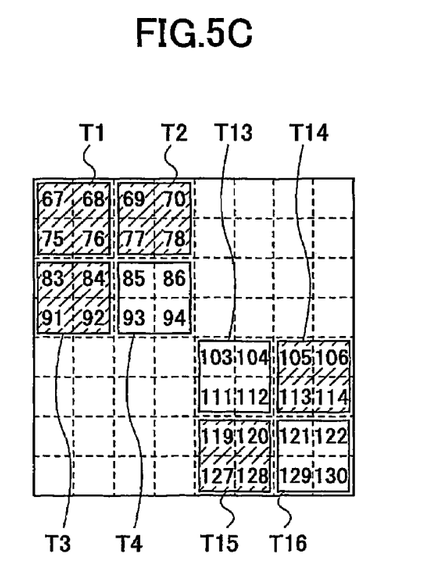
Figure 5D:
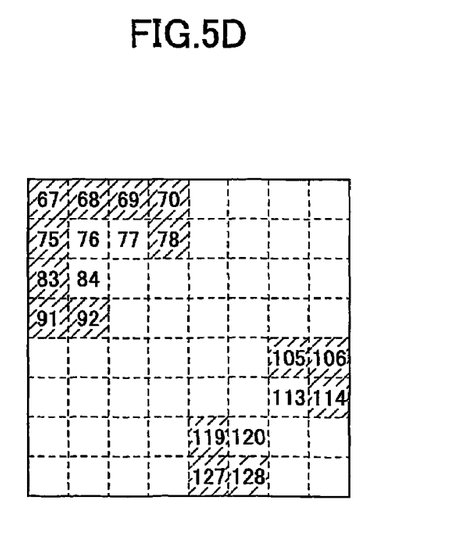

Next, the values of the TAG information T1 through T4 and T13 through T16 located at levels lower than the TAG information T17 and T20 are checked. As shown in FIG. 5C, when the value of the TAG information T1, T2, T3, T14 and T15 is "1", it may be seen that a code block having valid data exists within 5 regions indicated by the hatching. On the other hand, it may be seen that a code block having valid data does not exist in the regions of the TAG information T4, T13 and T16. Hence, it is unnecessary to confirm the inclusion information I of the packet information and the TAG information located at lower levels.

The inclusion information I of each code block located at levels lower than the TAG information T1, T2, T3, T14 and T15 is then checked for the first time. As a result, it may be found that valid data exists in the code blocks 67, 68, 69, 70, 75, 78, 83, 91, 92, 105, 106, 114, 119, 127 and 128. Accordingly, in an encoded data extracting process, a data extracting process for the number of zero-bit-planes only needs to be carried out with respect to these code blocks having the valid data, and the amount of data to be process is greatly reduced.

(6) ZERO-TAG Information Analyzing Circuit:

Next, a description will be given of the structure and operation of the ZERO-TAG information analyzing circuits 10 and 27. Since the ZERO-TAG information analyzing circuits 10 and 27 have the same structure, a description will hereunder be given with respect to the TAG information analyzing circuit 10.

Figure 6A:
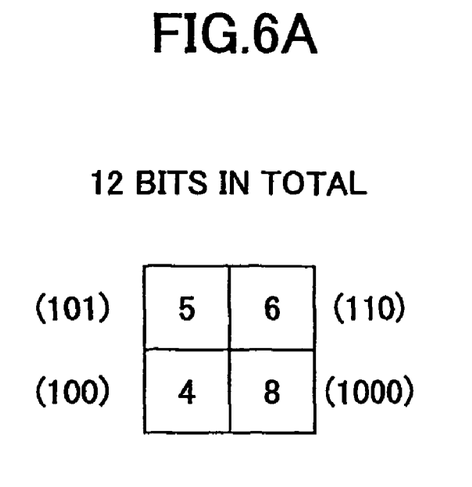
FIGS. 6A and 6B are diagrams for explaining ZERO-TAG information.
Figure 6B:
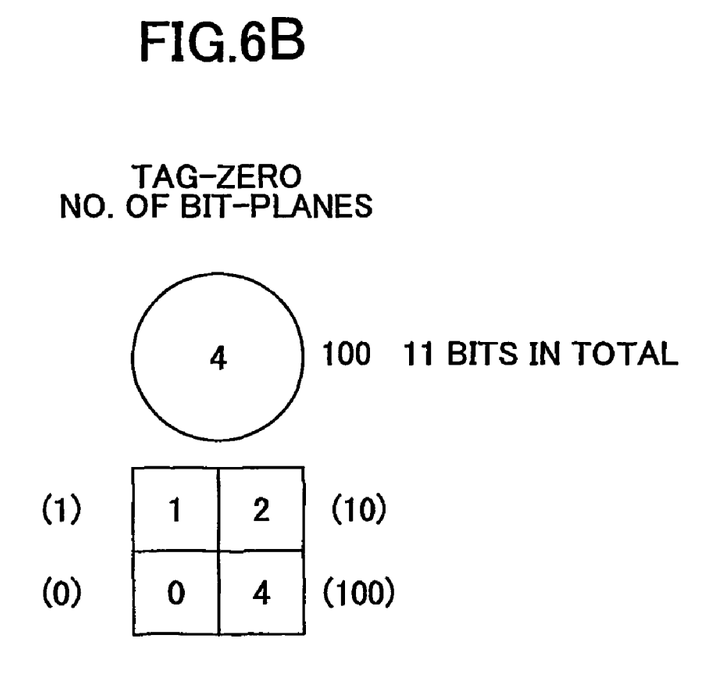

FIGS. 6A and 6B are diagrams for explaining ZERO-TAG information, that is, processing contents of the ZERO-TAG information analyzing circuit 10. In a case where the numbers of zero-bit-planes of the 2×2 code blocks are "5", "6", "4" and "8" as shown in FIG. 6A, the value of the ZERO-TAG information T is set to a minimum value "4" of the number of zero-bit-planes, and the number of zero-bit-planes of each code block is updated to a value which is obtained by subtracting the minimum value "4" as shown in FIG. 6B.

By carrying out an analyzing process described above, the number of zero-bit-planes of each code block is represented by a reduced number of digits (or bits) when making a binary representation which is the actual unit of processing (or processing unit). In the case shown in FIG. 6A, the number of bits is reduced to 11 bits=ZERO-TAG information of 3 bits ($4_{10}=100_2$)+1 bit ($1_{10}=1_2$)+2 bits ($2_{10}=10_2$)+1 bit ($0_{10}=0_2$)+3 bits ($4_{10}=100_2$) from 12 bits =3 bits ($5_{10}=101_2$)+3 bits ($6_{10}=110_2$)+3 bits ($4_{10}=100_2$)+4 bits ($8_{10}=1000_2$), as shown in FIG. 6B. Actually, a similar process may be carried out with respect to 2×2 ZERO-TAG information and sequentially obtaining the ZERO-TAG information of the higher levels, so as to further reduce the amount of data of the information indicating the number of zero-bit-planes.

Figure 7:
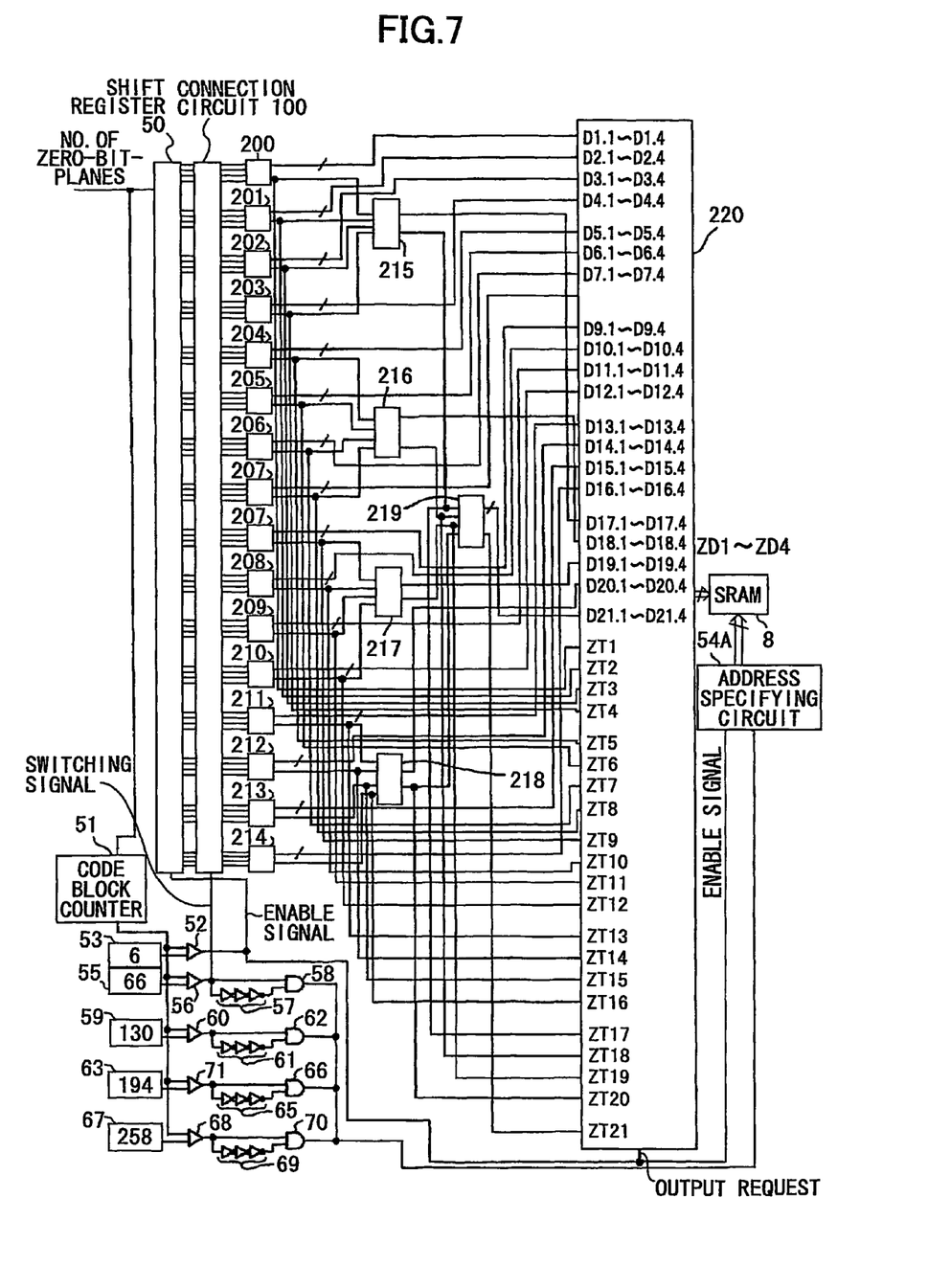
FIG. 7 is a circuit diagram showing a ZERO-TAG information analyzing circuit.

FIG. 7 is a circuit diagram showing the ZERO-TAG information analyzing circuit 10. The ZERO-TAG information analyzing circuit 10 inputs the data of the number of zero-bit-planes of the code blocks of all level-2 and level-3 sub-bands, the data of the number of zero-bit-planes of all code blocks of the level-1 sub-band 1HL, the data of the number of zero-bit-planes of all code blocks of the level-1 sub-band 1LH, and the data of the number of zero-bit-planes of all code blocks of the level-1 sub-band 1HH in a predetermined sequence, and immediately generates corresponding ZERO-TAG information. The generated ZERO-TAG information is output to the SRAM 8.

More particularly, the ZERO-TAG information analyzing circuit 10 obtains the ZERO-TAG information of each sub-band in 4 steps, similarly to the TAG information analyzing circuit 7 described above, and successively stores in the SRAM 8 the ZERO-TAG information of 4 data ZD1 through ZD4 (corresponding to the data D1 through D4 of the TAG information shown in FIG. 3) which are obtained the data of the number of zero-bit-planes having the reduced amount of data. Hence, it is possible to eliminate the need for a work memory having a large memory capacity, which was otherwise required by the conventional software processing. The data ZD1 is formed by the ZERO-TAG information ZT2 through ZT4 with respect to the level-3 sub-bands 3HL, 3LH and 3HH, the ZERO-TAG information ZT5 through ZT16 with respect to the level-2 sub-bands 2HL, 2LH and 2HH, the ZERO-TAG information ZT18 through T20 with respect to significant level, data D2.1 through D2.4, D3.1 through D3.4, . . . , D16.1 through D16.4 of the number of zero-bit-planes after the amount of data is reduced for the 7th through 66th code blocks, and ZERO-TAG information D17.1 through D17.4 and D21.1 through D21.4 after the amount of data is reduced and output from operation circuits 215 through 219.

The ZERO-TAG information is not obtained for the level-5 and level-4 sub-bands, because the size of these sub-bands is smaller than the size of one code block. Each of the data ZD2 through ZD4 is formed by the ZERO-TAG information ZT1 through ZT16, ZT17 through ZT20 and ZT21 with respect to the level-1 sub-bands 1LH, 1LH and 1HH, the data D2.1 through D2.4, D3.1 through D3.4, . . . , D16.1 through D16.4 of the number of zero-bit-planes after the amount of data is reduced for the 67th through 130th, 131st through 194th and 195th through 258th code blocks, and the ZERO-TAG information D17.1 through D17.4 and D21.1 through D21.4 after the amount of data is reduced and output from the operation circuits 215 through 219.

In FIG. 7, those parts which are the same as those corresponding pars of the TAG information analyzing circuit 7 shown in FIG. 4 are designated by the same reference numerals, and a description thereof will be omitted.

When the ZERO-TAG information analyzing circuit 10 and the TAG information analyzing circuit 7 are compared, it may be seen that the ZERO-TAG information analyzing circuit 10 is provided with operation circuits 200 through 219 in place of the AND gates 71 through 91 of the TAG information analyzing circuit 7, due to the different processing contents. The operation circuits 200 through 219 have the same structure. The operation circuits 200 through 219 outputs, in addition to the values (ZT1 through ZT21) of the ZERO-TAG information obtained by the operations thereof, the numbers of zero-bit-planes after the amount of data is reduced or the values (D1.1 through D1.4, D2.1 through D2.4, . . . , D21.1 through D21.4) of the ZERO-TAG information, to a data ZD generator 220. This data ZD generator 220 corresponds to the data D generator 92 of the TAG information analyzing circuit 7.

The values (ZT1 through ZT21) of the ZERO-TAG information obtained by the operation circuits 200 through 219 and the numbers of zero-bit-planes after the amount of data is reduced or the values (D1.1 through D1.4, D2.1 through D2.4, . . . , D21.1 through D21.4) of the ZERO-TAG information, which are output from the data ZD generator 220 are stored in the SRAM 8 at addresses specified by an address specifying circuit 54A. The address specifying circuit 54A switches the write address signal which is output to the SRAM 8 for the data ZD1, for the data ZD2, for the data ZD3 and for the data ZD4, in response to the pulse signals output from the AND gates 58, 62, 66 and 70.

Figure 8:
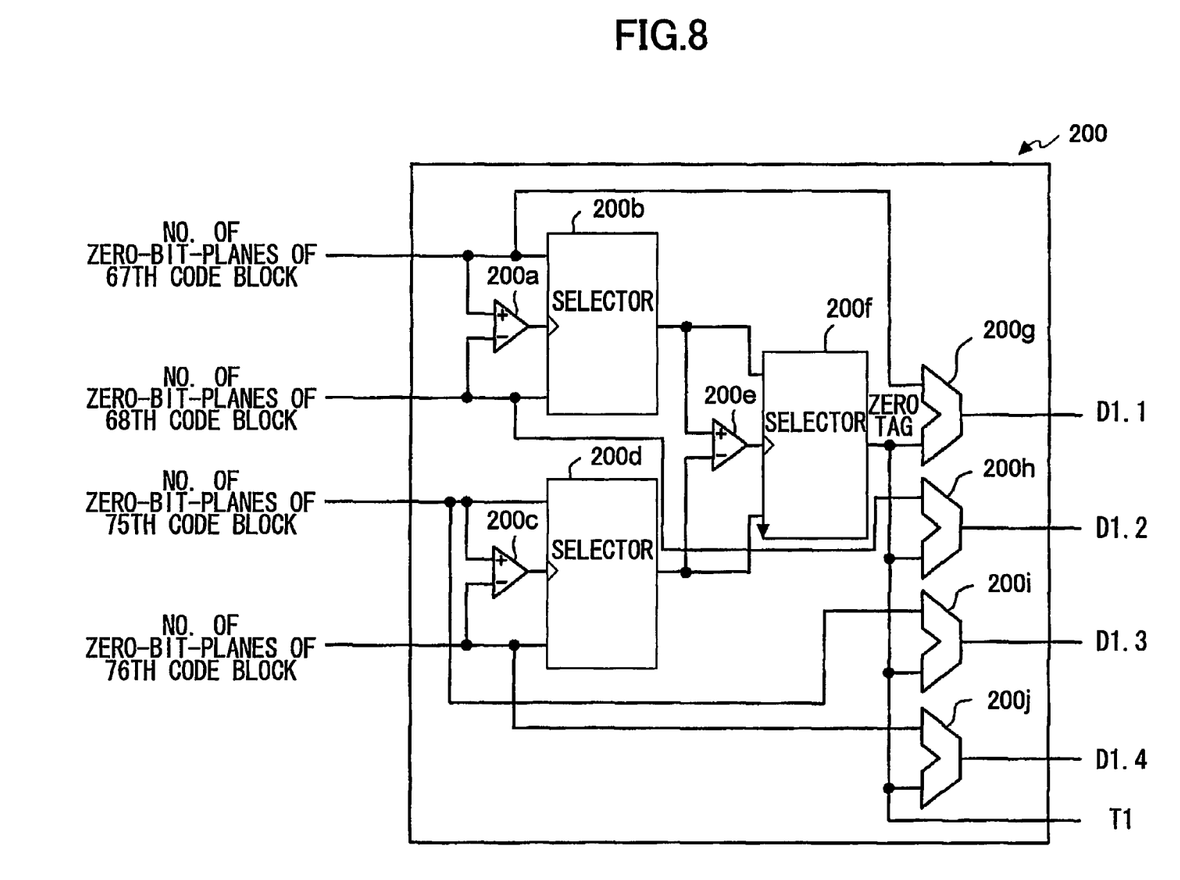
FIG. 8 is a circuit diagram showing an operation circuit.

FIG. 8 is a circuit diagram showing the operation circuit 200. The operation circuit 200 is used when obtaining the data ZD2, D3 and D2. For example, when obtaining the data ZD2, the data of the number of zero-bit-planes of the 67th, 68th, 75th and 76th code blocks, which will hereinafter be referred to as ZP67, ZP68, ZP75 and ZP76, are input to selectors 200b and 200d. Each of the selectors 200b and 200d is a 2-input-1-output type selector.

The data ZP67 and ZP68 are input to a comparator 200a. The comparator 200a outputs a high-level comparison result signal when the data ZP67 is larger than or equal to the data ZP68, and outputs a low-level comparison result signal when the data ZP67 is smaller than the data ZP68. The comparison result signal from the comparator 200a is input to a signal selection terminal of the selector 200b. The selector 200b selectively outputs the data ZP68 during the high-level period of the received comparison result signal, and outputs the data ZP67 during the low-level period of the received comparison result signal.

The data ZP75 and ZP76 are input to a comparator 200c. The comparator 200c outputs a high-level comparison result signal when the data ZP76 is larger than or equal to the data ZP75, and outputs a low-level comparison result signal when the data ZP76 is smaller than the data ZP75. The comparison result signal from the comparator 200c is input to a signal selection terminal of the selector 200d. The selector 200d selectively outputs the data ZP76 during the high-level period of the received comparison result signal, and outputs the data ZP75 during the low-level period of the received comparison result signal.

The data output from the selectors 200b and 200d are input to a comparator 200e and a selector 200f. The comparator 200e outputs a high-level comparison result signal when the value of the data output from the selector 200d is larger than or equal to the value of the data output from the selector 200b, and outputs a low-level comparison result signal when the value of the data output from the selector 200d is smaller than the value of the data output from the selector 200b. The comparison signal output from the comparator 200e is input to a signal selection terminal of the selector 200f. The selector 200f selectively outputs the data received from the selector 200d during the high-level period of the received comparison result signal, and selectively outputs the data received from the selector 200b during the low-level period of the received comparison result signal. The data from the selector 200f is output as the data value ZT1 of the ZERO-TAG information.

An operation unit 200g subtracts the data value ZT1 from the data ZP67, and outputs the obtained value as the data D1.1 of the number of zero-bit-planes after the amount of data is reduced for the 67th code block. An operation unit 200h subtracts the data value ZT1 from the data ZP68, and outputs the obtained value as the data D1.2 of the number of zero-bit-planes after the amount of data is reduced for the 68th code block. An operation unit 200i subtracts the data value ZT1 from the data ZP75, and outputs the obtained value as the data D1.3 of the number of zero-bit-planes after the amount of data is reduced for the 75th code block. An operation unit 200j subtracts the data value ZT1 from the data ZP76, and outputs the obtained value as the data D1.4 of the number of zero-bit-planes after the amount of data is reduced for the 76th code block.

When obtaining the data DZ3, the data of the number of zero-bit-planes of the 131st, 132nd, 139th and 140th code blocks (that is, ZP131, ZP132, ZP139 and ZP140) are input to the selectors 200b and 200d in place of the data ZP67, ZP68, ZP75 and ZP76, respectively. In addition, when obtaining the data DZ4, the data of the number of zero-bit-planes of the 195th, 196th, 203rd and 204th code blocks (that is, ZP195, ZP196, ZP203 and ZP204) are input to the selectors 200b and 200d in place of the data ZP67, ZP68, ZP75 and ZP76, respectively.

Figure 9:
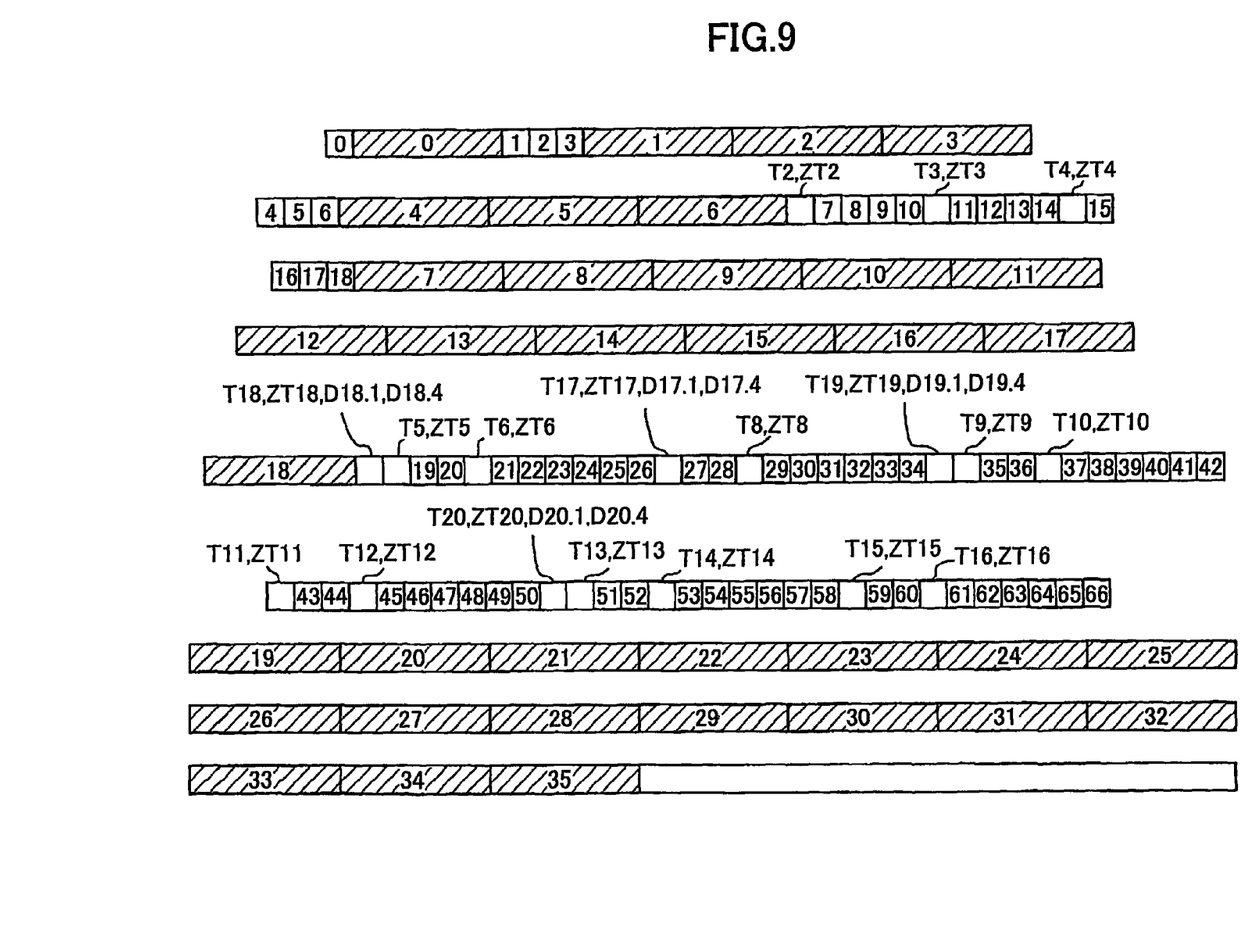
FIG. 9 is a diagram showing a structure of a codestream which is made up of packet information including the TAG information, the ZERO-TAG information and the like, and encoded data.

FIG. 9 is a diagram showing a structure of a codestream which is made up of packet information including the TAG information and the ZERO-TAG information generated by the TAG information analyzing circuit 7 and the ZERO-TAG information analyzing circuit 10 and the data of the number of zero-bit-planes after the amount of data is reduced, and the encoded data. As shown in FIG. 9, the packet information is inserted before the packet header of the code block which is to be processed and has the first number. For example, the TAG information T2 and the ZERO-TAG information ZT2 of the 7th through 10th code blocks are inserted before the packet header of the 7th code block. In addition, the TAG information T18, the ZERO-TAG information ZT18, the updated data of the number of bit-planes D18.1 through D18.4, and the updated data of the ZERO-TAG information ZT5 are inserted before the 19th code block.

Further, the present invention is not limited to these embodiments, but various variations and modifications may be made without departing from the scope of the present invention.

The invention claimed is:

1. An image processing method for generating TAG information based on inclusion information which indicates an existence of significant data in code blocks for each of sub-bands, according to JPEG2000 standard, comprising the steps of:
  (a) accepting the inclusion information of the code blocks in a predetermined sequence in units of code blocks amounting to a number which is smaller than a number of code blocks of sub-bands in all levels; and
  (b) immediately generating and outputting TAG information corresponding to the accepted inclusion information.

2. The image processing method as claimed in claim 1, wherein said step (a) inputs the inclusion information of the code blocks of all level-2 and level-3 sub-bands, the inclusion information of all code blocks of a level-1 sub-band 1HL, the inclusion information of all code blocks of a level-1 sub-band 1 HL, and the inclusion information of all code blocks of a level-1 sub-band 1HH, in a predetermined sequence.

3. The image processing method as claimed in claim 1, further comprising the steps of:
  (c) accepting data of numbers of zero-bit-planes in a predetermined sequence in units of code blocks amounting to a number which is smaller than a number of code blocks of sub-bands of all, levels, said zero-bit-planes being bit-planes in which all significant bits of the code blocks in each of the sub-bands are zero; and
  (d) immediately generating and outputting ZERO-TAG information corresponding to the accepted numbers of zero-bit-planes, according to the JPEG2000 standard.

4. The image processing method as claimed in claim 3, wherein said step (c) inputs the data of the number of zero-bit-planes of the code blocks of all level-2 and level-3 sub-bands, the data of the number of zero-bit-planes of all code blocks of a level-1 sub-band 1HL, the data of he number of zero-bit-planes of all code blocks of a level-1 sub-band 1LH, and the data of the number of zero-bit-planes of all code blocks of a level-1 sub-band 1HH, in a predetermined sequence.

5. An image processing method for generating ZERO-TAG information based on data of numbers of zero-bit-planes in which all significant bits of code blocks in each of sub-bands are zero, according to JPEG2000 standard, comprising the steps of:
  (a) accepting data of the numbers of zero-bit-planes in a predetermined sequence in units of code blocks amounting to a number which is smaller than a number of code blocks of sub-bands of all levels; and
  (b) immediately generating and outputting ZERO-TAG information corresponding to the accepted numbers of zero-bit-planes.

6. The image processing method as claimed in claim 5, wherein said step (a) inputs the data of the number of zero-bit-planes of the code blocks of all level-2 and level-3 sub-bands, the data of the number of zero-bit-planes of all code blocks of a level-1 sub-band 1HL, the data of the number of zero-bit-planes of all code blocks of a level-1 sub-band 1LH, and the data of the number of zero-bit-planes of all code blocks of a level-1 sub-band 1HH, in a predetermined sequence.

7. An image processing apparatus comprising:
  a TAG information analyzing circuit to generate TAG information based on inclusion information which indicates an existence of significant data in code blocks for each of sub-bands, according to JPEG2000 standard, said TAG information analyzing circuit accepting the inclusion information of the code blocks in a predetermined sequence in units of code blocks amounting to a number which is smaller than a number of code blocks of sub-bands in all levels, and immediately generating and outputting TAG information corresponding to the accepted inclusion information.

8. The image processing apparatus as claimed in claim 7, wherein said TAG information analyzing circuit inputs the inclusion information of the code blocks of all level-2 and level-3 sub-bands, the inclusion information of all code blocks of a level-1 sub-band 1HL, the inclusion information of all code blocks of a level-1 sub-band 1LH, and the inclusion information of all code blocks of a level-1 sub-band, 1HH, in a predetermined sequence.

9. The image processing apparatus as claimed in claim 7, further comprising:
a ZERO-TAG information analyzing circuit to generate ZERO-TAG information based on data of numbers of zero-bit-planes in which all significant bits of code blocks in each of sub-bands are zero, according to JPEG2000 standard,
said ZERO-TAG information analyzing circuit accepting data of numbers of zero-bit-planes in a predetermined sequence in units of code blocks amounting to a number which is smaller than a number of code blocks of sub-bands of all levels, and immediately generating and outputting ZERO-TAG information corresponding to the accepted numbers of zero-bit-planes.

10. The image processing apparatus as claimed in claim 9, wherein said ZERO-TAG information analyzing circuit inputs the data of the number of zero-bit-planes of the code blocks of all level-2 and level-3 sub-bands, the data of the number of zero-bit-planes of all code blocks of a level-1 sub-band 1HL, the data of the number of zero-bit-planes of all code blocks of a level-1 sub-band 1LH, and the data of the number of zero-bit-planes of all code blocks of a level-1 sub-band 1HH, in a predetermined sequence.

11. An image processing apparatus comprising:
a ZERO-TAG information analyzing circuit to generate ZERO-TAG information based on data of numbers of zero-bit-planes in which all significant bits of code blocks in each of sub-bands are zero, according to JPEG2000 standard,
said ZERO-TAG information analyzing circuit accepting data of the numbers of zero-bit-planes in a predetermined sequence in units of code blocks amounting to a number which is smaller than a number of code blocks of sub-bands of all levels, and immediately generating and outputting ZERO-TAG information corresponding to the accepted numbers of zero-bit planes.

12. The image processing apparatus as claimed in claim 11, wherein said ZERO-TAG information analyzing circuit inputs the data of the number of zero-bit-planes of the code blocks of all level-2 and level-3 sub-bands, the data of the number of zero-bit-planes of all code blocks of a level-1 sub-band 1HL, the data of the number of zero-bit-planes of all code blocks of a level-1 sub-band 1LH, and the data of the number of zero-bit-planes of all code blocks of a level-1 sub-band 1HH, in a predetermined sequence.

13. The image processing apparatus as claimed in claim 7, wherein in image compression said TAG information analyzing circuit generates the TAG information for a predetermined number of code blocks, prior to accepting the inclusion information of other codes blocks in said all levels, said predetermined number being less than the total number of code blocks of the sub-bands in said all levels.

14. The image processing apparatus as claimed in claim 11, wherein in image compression said ZERO-TAG information analyzing circuit generates the ZERO-TAG information for a predetermined number of code blocks, prior to accepting the data of the numbers of zero-bit-planes in other codes blocks in said all levels, said predetermined number being less then the total number of code blocks of the sub-bands in said all levels.

15. The image processing method as claimed in claim 1, wherein in image compression said TAG information is generated and output in step (b) for a predetermined number of code blocks, prior to accepting the inclusion information of other codes blocks in said all levels, said predetermined number being less than the total number of code blocks of the sub-bands in said all levels.

16. The image processing method as claimed in claim 1, wherein in image compression said ZERO-TAG information is generated and output in step (b) for a predetermined number of code blocks, prior to accepting the data of the numbers of zero-bit-planes in other codes blocks in said all levels, said predetermined number being less than the total number of code blocks of the sub-bands in said all levels.

* * * * *